United States Patent [19]

Ishii et al.

[11] Patent Number: 5,237,021
[45] Date of Patent: Aug. 17, 1993

[54] THERMOSETTING RESINOUS COMPOSITION CONTAINING POLYFUNCTIONAL OXAZOLIDINONE COMPONENT AND POLYAMINE COMPONENT

[75] Inventors: Toshiyuki Ishii, Sakai; Hiroyuki Nojiri, Takatsuki; Mitsuo Yamada, Suita; Ryuzo Mizuguchi, Yawata, all of Japan

[73] Assignee: Nippon Paint Co., Ltd., Osaka, Japan

[21] Appl. No.: 941,297

[22] Filed: Sep. 4, 1992

[30] Foreign Application Priority Data

| | | | |
|---|---|---|---|
| Sep. 5, 1991 | [JP] | Japan | 3-254413 |
| Sep. 5, 1991 | [JP] | Japan | 3-254414 |
| Sep. 5, 1991 | [JP] | Japan | 3-254415 |
| Sep. 5, 1991 | [JP] | Japan | 3-254416 |

[51] Int. Cl.$^5$ .................................. C08F 283/00
[52] U.S. Cl. ..................... 525/514; 525/504; 525/509; 525/510; 528/88; 528/99; 528/117; 526/260
[58] Field of Search ............... 525/504, 514, 509, 510; 526/260; 528/88, 94, 117

[56] References Cited

U.S. PATENT DOCUMENTS

| | | | |
|---|---|---|---|
| 2,399,118 | 4/1946 | Homeyer | 548/229 |
| 3,519,608 | 7/1970 | Kelley | 526/260 |
| 3,676,397 | 7/1972 | Clarke | 528/109 |
| 3,687,897 | 8/1972 | Clarke | 525/528 |
| 3,876,618 | 4/1975 | Clarke | 525/534 |
| 3,979,406 | 9/1976 | D'Alelio | 525/326.8 |
| 4,022,721 | 5/1977 | Ashida | 521/108 |
| 4,129,695 | 12/1978 | Bonin | 521/108 |
| 4,631,306 | 12/1986 | Markert et al. | 525/528 |
| 4,786,693 | 11/1988 | Hefner, Jr. | 525/454 |
| 4,959,499 | 9/1990 | Harris | 564/59 |
| 5,138,016 | 8/1992 | Murdock et al. | 528/55 |
| 5,145,920 | 9/1992 | Hess et al. | 525/528 |

*Primary Examiner*—Melvyn I. Marquis
*Assistant Examiner*—Randy Gulakowski
*Attorney, Agent, or Firm*—Millen, White, Zelano & Branigan

[57] ABSTRACT

A thermosetting resinous composition contains (a) a polyfunctional oxazolidinone compound and (b) a polyamine which react with one another a polyurea polymer upon heating without emitting any emanating by-product. A novel class of polyfunctional oxazolidinone compounds and an improved method for producing the same are also disclosed.

12 Claims, No Drawings

THERMOSETTING RESINOUS COMPOSITION CONTAINING POLYFUNCTIONAL OXAZOLIDINONE COMPONENT AND POLYAMINE COMPONENT

BACKGROUND OF THE INVENTION

This invention relates to a thermosetting resinous composition which cures into a rigid state upon heating through the ring-opening reaction of 2-oxazolidinone ring with amine into a urea linkage. It also relates to a novel compound or resin having a plurality of 2-oxazolidinone rings in the molecule which constitutes one of components of said thermosetting resinous composition.

In the coating industry, there is a long standing demand for a thermosetting resinous composition or system which is stable at room temperature but may be cured to a rigid film upon heating at an elevated temperature without emitting any by-product. Heretofore, thermosetting compositions containing etherified melamine resins or blocked polyisocyanates have been widely used in the coating industry. Compositions containing etherified melamine resins, however, emit an alcohol which has been used to etherify the melamine resin, while compositions containing blocked polyisocyanates emit a blocking agent such as alcohols, phenols, lactams or oximes. The emission of these by-products are undesirable not only for environmental reasons but also for technical reasons. Namely, it increase the amount of internal stress developed in the cured film resulting in poor appearance and other properties.

Epoxy resins and polyurethane or polyurea resins may be used for coating purposes. However, they are generally curable even at room temperature and thus must be formulated in a two components paint composition. Moreover, they are not usable in water-borne paints as a film-forming component.

It is known from literatures e.g. Bull. Soc. Chem. France, 1069 (1957); and ibid. 1841 (1959); that 2-oxazolidinone compounds otherwise known as cyclic urethanes may be ring-opened with an amine to produce corresponding urea derivatives. U.S. Pat. No.3,519,608 and Bull. Chem. Soc. Jpn., 61 (10), 3559(1988) disclose a linear polymer having a plurality of 2-oxazolidinone ring-containing pendant groups. However, these literatures neither disclose nor suggest to utilize the above ring-opening reaction of 2-oxazolidinone ring in the production of polyurea polymers in which a number of urea linkages are recurring.

Accordingly, it is a major object of this invention to provide a novel thermosetting resinous composition containing 2-oxazolidinone and amine components capable of curing into a rigid state upon heating at an elevated temperature to produce a polyurea polymer without emitting any by-product.

It is another object of this invention to provide a novel 2-oxazolidinone derivative usable in the above resinous composition as the 2-oxazolidinone component thereof as well as an improved method for preparing said 2-oxazolidinone derivative.

Other objects and advantages of this invention will become apparent to those skilled in the art as the description proceeds.

SUMMARY OF THE INVENTION

In one aspect, the present invention provides a thermosetting resinous composition comprising:

(a) a compound having a plurality of terminal and/or pendant 2-oxo-1, 3-oxazolidin-5-yl groups, and (b) a compound having a plurality of primary and/or secondary amino groups.

In another aspect of the invention, there is provided a novel 2-oxazolidinone derivative of one of the formulas I, II and III:

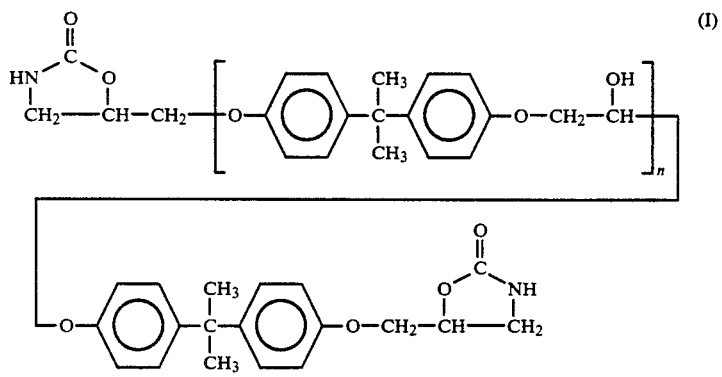

(I)

wherein n is 0, or an integer up to 10;

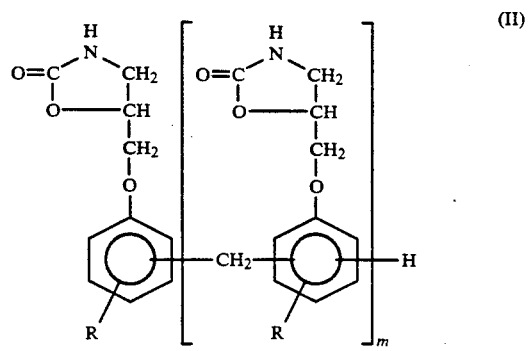

(II)

wherein R is a hydrogen atom or methyl, and m is an integer up to 10; and

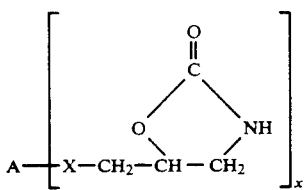

(III)

wherein A is the residue of a polycarboxylic acid with removal of the caboxylic function or the residue of an aliphatic polyol residue with removal of the hydroxyl function, X is a ester or ether linkage, and x is the valence of the residue A.

In a further aspect of the invention, there is provided a method for preparing a 2-oxazolidinone compound comprising reacting an oxirane compound with a carbamic acid ester, the improvement comprising using a tertiary amine and a tin compound in combination as a catalyst.

DETAILED DISCUSSION

The curing mechanism of the resinous composition of this invention may be represented by the following reaction scheme:

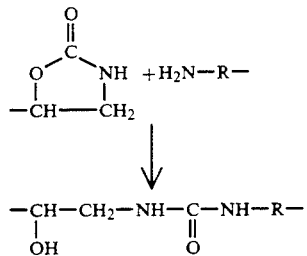

As shown above, the resulting cured product is a polyurea polymer. Polyurea polymers have hitherto been produced from a free polyisocyanate compound and a polyamine. The reaction between these components, however, takes place even at the ambient temperature. Therefore, the two components must be kept separately and mixed together immediately before use. Epoxy resins to be used in combination with an acid anhydride or polyamine hardener must suffer from similar problems.

The resinous composition of this invention does not undergo the curing reaction at the ambient temperature and, thus, may be formulated in a stable unitary composition without restriction of pot life. Furthermore, the composition does not emit any emanating by-product upon curing and may find use in solvent- or water-borne paints, powder paints, adhesives, molding materials, electrical insulating materials and the like.

One class of the compounds having a plurality of 2-oxo-1, 3-oxazolidin-5-yl groups (hereinafter simply referred to as "oxazolidinone ring") includes the above-mentioned modified epoxy resin of the formula I derived from a corresponding bisphenol A epoxy resin and the modified epoxy resin of the formula II derived from a corresponding novolac epoxy resin.

Examples of starting bisphenol A epoxy resins include EPIKOTE 827 (Yuka Shell Epoxy K.K. epoxy equivalent 180-190), EPOKOTE 1001 (ditto, epoxy equivalent 450-500), EPIKOTE 1010 (ditto, epoxy equivalent 3000-5000) and the like. Examples of starting novolac epoxy resins include EPOKOTE 152 (ditto, phenol novolac epoxy resin, epoxy equivalent 172-179), EPIKOTE 180S65 (ditto, cresol novolac epoxy resin, epoxy equivalent 205-220) and the like. These epoxy resins are modified to have a plurality of oxazolidinone rings by reacting with a carbamic acid ester such as methyl, ethyl, i-propyl, butyl, benzyl, phenyl, or 2-hydroxyethyl carbamate.

Another class of the compounds having a plurality of oxazolidinone rings includes the above-mentioned polycarboxylic acid oxazolidinone ester of the formula III and aliphatic polyol oxazolidinone ether of the formula III The oxazolidinone ester or ether may be prepared by reacting a corresponding glycidyl ester or ether with a carbamic acid ester as exemplified above. Examples of polycarboxylic acid glycidyl esters include diglycidyl phthalate, diglycidyl hexahydrophthalate, diglycidyl adipate and the like. Examples of aliphatic polyol glycidyl ethers include ethylene glycol diglycidyl ether, 1, 4-butanediol diglycidyl ether, polyethylene glycol diglycidyl ether, polytetramethylene glycol diglycidyl ether, trimethylolpropane triglycidyl ether, pentaerythritol tetraglycidyl ether and the like.

A further class of the compound having a plurality of oxazolidinone rings includes acrylic polymers having a plurality of oxazolidinone ring-containing pendant groups which are produced by polymerizing or copolymerizing oxazolidinone acrylate or methacrylate as disclosed in U.S. Pat. No. 3,519,608, or by reacting a glycidyl group-containing acrylic polymer with a carbamate ester as mentioned above. Examples of glycidyl group-containing acrylic polymers include copolymers of glycidyl acrylate and/or glycidyl mathacrylate with other comonomers such as methyl acrylate, ethyl acrylate, n-butyl acrylate, methyl methacrylate, ethyl methacrylate, n-butyl methacrylate, acrylic acid, methacrylic acid, itaconic acid, acrylamide, methacrylamide, diacetoneacrylamide, styrene, vinyl toluene and the like.

Generally speaking, the preparation of the polyfunctional oxazolidinone compound used in this invention involves the following reaction:

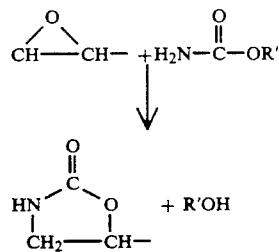

The above reaction per se as well as the catalyst effective to promote the reaction is well-known. It has been discovered that when using a tertiary amine and a tin compound as a catalyst of the above reaction in combination, the desired oxazolidinone compound may be obtained in an unexpectedly good yield. Examples of usable tertiary amines include aliphatic amines such as triethylamine or N, N, N', N'-tetramethylethylenediamine; alicyclic amines such as N, N-dimethylcyclohexylamine; aralkylamines such as N, N-dimethylbenzylamine; aromatic amines such as N, N-dimethylaniline; and heterocyclic amines such as pyridine, quinoline, imidazole, N-methylmorpholine, 1, 4-diazabicyclo [2.2.2.]octane or 1, 8-diazabicyclo [5.4.0]-7-undecene.

Examples usable tin compounds include stannous chloride, dibutyltin dilaurate, stannous octenate, dibutyltin oxide, dioctyltin oxide, 1, 3-diacetoxytetrabutyldistannoxane, 1, 3-dichlorotetrabutylstannoxane, dibutyldibutoxytin and so on.

Other polyfunctional oxirane compounds may be used to produce the polyfunctional oxazolidinone component of the present invention according to the above-mentioned reaction. Examples thereof includes α, ω-diolefin epoxide such as 1, 2, 3, 4-diepoxybutane or 1, 2, 7, 8-diepoxyoctane; polyphenol polyglycidyl ethers such as hydroquinone diglycidyl ether or resorcinol diglycidyl ether; and polyglycidylamines such as N, N-diglycidylaniline, N, N, N', N'-tetraglycidyl-m-xylenediamine, or 1, 3-bis(N, N-diglycidylaminomethyl)cyclohexane.

Apart from the reaction with a carbamic acid ester, the polyfunctional oxazolidinone compound may be synthesized using any known method e.g. by reacting the polyfunctional oxirane compound with ammonia followed by cyclizing the resulting amino alcohol with an alkyl carbonate (U.S. Pat. No. 2,399,118) or phosgene (British Patent No. 8894198), or reacting an aromatic polyol compound with tris-(2, 3-epoxypropyl)isocyanurate (Japanese Patent Kokai No. 88963/1976; Bull. Chem. Soc. Jpn., 61, 3559(1988) ).

Polyfunctional oxazolidinone compounds derived from bisphenol A epoxy resins, novolac epoxy resins, polycarboxylic acid glycidyl esters, aliphatic polyol glycidyl ethers and glycidyl group-containing acrylic polymers are preferred among others. Preferably, these compounds have a number average molecular weight from 200 to 100,000, more preferably from 300 to 10,000, and an oxazolidinone equivalent from 0.02 to 20 meq./g.

The polyamine component (b) of the resinous composition may be a compound having a plurality of primary and/or secondary amino groups as conventionally used in the production of polyurea polymers. Examples thereof include hexamethylenediamine, 4, 4'-diaminodicyclohexylmethane, isophoronediamine, metaphenylenediamine, diethylenetriamine, triethylenetetramine, polyethyleneimine, polyoxyalkylenepolyamine such as JEFFAMINE D-2000 (Texaco Chemical, amine equivalent ca. 1000), JEFFAMINE T403 (ditto, amine equivalent ca.160) and TEXRIM TR-5050 (ditto, amine equivalent ca. 1930); and ketimine-modified polyfunctional epoxy compounds which are produced by reacting a polyfunctional epoxy compound with a compound having both primary and secondary amino functions in the molecule whose primary amino function has been blocked with a ketone such as acetone or methylisobutylketone. Examples of amines usable for this purpose include diethylenetriamine and N-aminoethylethanolamine. Examples of polyfuntional epoxy compounds include bisphenol A epoxy resins and novolac epoxy resins as mentioned above. .

The polyamine component (b) may be neutralized with an organic acid such as acetic acid or lactic acid when formulating a water-borne paint. The polyamine component (b) preferably has a number average molecular weight from 150 to 100,000, more preferably from 200 to 20,000, and an amine equivalent from 0.02 to 30 meq./g.

The resinous composition of this invention may contain the polyfunctional oxazolidinone component (a) and the polyamine component (b) at a ratio from 1:5 to 5:1 in terms of equivalents of the oxazolidinone ring and the reactive amino group. The composition may contain a small proportion of a conventional cross-linker unless low by-product emission characteristics are severely impaired The composition may contain a variety of conventional additives such as pigments, organic solvents and the like when paint formulations are intended. The composition may be cured by heating at a temperature from 120° C. to 180° C. for 10 minutes to 1 hour. The curing reaction may be promoted by incorporating as a catalyst from 0.1 to 5% by weight of the composition of a tin compound such stannous chloride, dibutyltin dilaurate or dibutyltin oxide; an organic acid salt or acetylacetonato complex of zinc, lead or aluminum; and a tertiary amine such as N, N-dimethylbenzylamine, 1, 4-diazabicyclo[2.2.2.]octane or 1, 8-diazabicyclo-[5.4.0]-7-undecene.

The following examples are intended to further illustrate the present invention without limiting thereto. All parts and percents therein are by weight unless otherwise indicated.

PRODUCTION EXAMPLE 1

A reactor equipped with a reflux condenser, stirrer, thermometer, decanter and nitrogen gas tube was charged with 180 parts of an epoxy resin having an epoxy equivalent of 180 (EPIKOTE 827, Yuka Shell Epoxy K.K.), 89 part of ethyl carbamate, 2 parts of N, N-dimethylbenzylamine and 2 parts of di-n-butyltin dilaurate. The mixture was allowed to react at 130° C. for 2 hours while blowing nitrogen gas into the mixture. 46 parts of ethanol were recovered as a by-product. The IR spectrophotometry of the resulting viscous colorless liquid revealed the absorbance of carbonyl group of oxazolidinone ring at 1740 cm$^{-1}$ and the absence of the absorbances of epoxy group at 905 cm$^{-1}$ and of carbamate carbonyl at 1720 cm$^{-1}$. The oxazolidinone equivalent was 4.7 meq./g.

PRODUCTION EXAMPLE 2

The same reactor as used in Production Example 1 was charged with 147 parts of trimethylolpropane triglycidyl ether (EPOTOTO YH-300, Toto Kasei Co., Ltd., epoxy equivalent 147), 89 parts of ethyl carbamate, 2 parts of N, N-dimethylbenzylamine, and 2 parts of dibutyltin dilaurate. The mixture was heated to 140° C. and then to 160° C. over one hour. 46 parts of ethanol were recovered as a by-product. The IR spectrophotometry of the resulting product revealed the absorbance of oxazolidinone carbonyl at 1740 cm$^{-1}$ and the absence of absorbances of epoxy group at 905 cm$^{-1}$ and of carbamate carbonyl at 1720 cm$^{-1}$. The oxazolidinone equivalent was 5.3 meq./g. This product was diluted with 63 parts of methylisobutylketone to a solid content of 75%.

PRODUCTION EXAMPLE 3

The same reactor as used in Production Example 1 was charged with 231 parts of pentaerythritol tetraglycidyl ether (DENACOL EX-411, Nagase Kasei K.K. epoxy equivalent 231), 89 parts of ethyl carbamate, 2 parts of N, N-dimethylbenzylamine, and 2 parts of dibutyltin dilaurate. The mixture was heated to 140° C. and then to 160° C. over 1.5 hours. 46 parts of ethanol were recovered. The IR spectrophotometry revealed the absorbance of oxazolidinone carbonyl at 1740 cm$^{-1}$ and the absence of absorbances of epoxy at 905 cm$^{-1}$ and of carbamate carbonyl at 1720 cm$^{-1}$. The oxazolidinone equivalent was 3.6 meq./g.

PRODUCTION EXAMPLE 4

A reactor equipped with a reflux condenser, stirrer, thermometer, decanter, drip funnel and nitrogen gas source was charged with 50 parts of xylene and heated to 100° C. To the reactor was added dropwise a monomer mixture having the following composition over 3 hours.

|  |  |
|---|---|
| Glycidyl methacrylate | 30 parts |
| Styrene | 10 parts |
| Methyl methacrylate | 40 parts |
| n-Butyl acrylate | 20 parts |
| t-Butylperoxy 2-ethylhexanoate | 1.2 parts |

After the addition, the mixture was kept at the same temperature for 30 minutes. Then, 16.6 parts of xylene were added dropwise over 1 hour, and the mixture allowed to react at 100° C., for additional 3 hours and then cooled.

To the resulting resin solution were added 19 parts of ethyl carbamate, 1 part of N, N-dimethylbenzylamine and 1 part of dibutyltin dilaurate. The mixture was heated to 140° C. and then to 160° C. over 1.5 hours. 10 parts of ethanol were recovered. The product was recovered by precipitation from methanol added to the reactor. Spectrophotometry revealed the absorbance of oxazolidinone carbonyl at 1740 cm$^{-1}$ and the absence of absorbances of epoxy at 905 cm$^{-1}$ and of carbamate carbonyl at 1720 cm$^{-1}$. The oxazolidinone equivalent was 2.4 meq./g. The number average molecular weight determined by the GPC method was 8,000.

PRODUCTION EXAMPLE 5

Analogous to Production Example 1, 190 parts of a bisphenol A epoxy resin (EPIKOTE 1001, Yuka Shell Epoxy K.K., epoxy equivalent 475), 35,6 g of ethyl carbamate, 3.4 parts of N, N-dimethylbenzylamine and 3.4 parts of di-n-butyltin dilaurate were reacted. The IR spectrophotometry of the product revealed the absorbance of oxazolidinone carnonyl at 1740 cm$^{-1}$ and the absence of absorbances of epoxy at 905 cm$^{-1}$ and of carbamate carbonyl at 1720 cm$^{-1}$.

PRODUCTION EXAMPLE 6

Analogous to Production Example 1, 400 parts of a bisphenol A epoxy resin (EPIKOTE 1010, Yuka Shell Epoxy K.K., epoxy equivalent 4000), 8.9 parts of ethyl carbamate. 0.8 parts of N, N-dimethylbenzylamine and 0.8 parts of di-n-butyltin dilaurate were reacted in 100 parts of xylene. The IR spectrophotometry of the product revealed the absorbance of oxazolidinone carbonyl at 1740 cm$^{-1}$ and the absence of absorbances of epoxy at 905 cm$^{-1}$ and of carbamate carbonyl at 1720 cm$^{-1}$.

PRODUCTION EXAMPLE 7

Analogous to Production Example 1, 220 parts of a cresol novolac epoxy resin (EPIKOTE 180S65, Yuka Shell Epoxy K.K., epoxy equivalent 220), 89 parts of ethyl carbamate, 5.2 parts of N, N-dimethylbenzylamine and 5.2 parts of di-n-butyltin dilaurate were reacted. The IR spectrophotometry of the product revealed the absorbance of oxazolidinone carbonyl at 1740 cm$^{-1}$ and the absence of absorbances of epoxy at 905 cm$^{-1}$ and of carbamate carbonyl at 1720 cm$^{-1}$.

PRODUCTION EXAMPLE 8

8.7 parts of ethylene glycol diglycidyl ether was reacted with 8.9 parts of ethyl carbamate in the presence of 0.3 parts of N, N-dimethylbenzylamine and 0.3 parts of dibutyltin dilaurate at 140° C. for 2 hours. The product was purified by silica gel chromatography (developing solvent, ethyl acetate: methanol=4:1). 11.7 parts (90% of theory) of ethylene glycol bis(2-oxo-1, 3-oxazolidin-5-ylmethyl)ether was obtained as white crystals melting at 90°–95 ° C.

$^1$H-NMR (DMSO, δ) 3.10–3.75 (m, 12H), 4.55–4.81 (m, 2H), 7.47 (BS, 2H)

PRODUCTION EXAMPLE 9

Analogous to Production Example 8, 5.1 parts of 1, 4 butanediol diglycidyl ether was reacted with 4.5 parts of ethyl carbamate in the presence of 0.2 parts of N, N-dimethylbenzylamine and 0.2 parts of dibutyltin dilaurate. 6.7 parts (92% of theory) of 1, 4-butanediol bis(2-oxo-1, 3-oxazolidin-5-ylmethyl)ether was obtained as white crystals melting at 80°–85° C.

$^1$H-NMR (DMSO, δ) 1.38–1.70 (m, 4H), 3.05–3.62 (m, 12H), 4.51–4.85 (m, 2H), 7.52(bs, 2H)

PRODUCTION EXAMPLE 10

Analogous to Production Example 8, 8.0 parts of diglycidyl hexahydrophthalate was reacted with 4.5 parts of ethyl carbamate in the presence of 0.3 parts of N, N-dimethylbenzylamine and 0.3 parts of dibutyltin dilaurate. 8.2 parts (80% of theory) of bis(2-oxo-1, 3-oxazolin-5-ylmethyl) hexahydrophthalate was obtained as pale yellow solid.

$^1$H-NMR (DMSO, δ) 0.90–2.10 (m, 8H), 2.90 (m, 2H), 3.22 (DD, 2H), 3.58 (t, 2H), 4.18 (d, 4H), 4.78(m, 2H), 6.50 (bs, 2H)

Similarly, the following compounds were produced:

1, 6-hexanediol bis(2-oxo-1, 3-oxazolidin-5-ylmethyl)ether;

polyethylene glycol bis(2-oxo-1, 3-oxazolidin-5-ylmethyl)ether;

Polypropylene glycol bis(2-oxo-1, 3-oxazolidin-5-ylmethyl)ether;

bis(2-oxo-1, 3-oxazolidin-5-ylmethyl)phthalate; and bis(2-oxo-1, 3-oxazolidin-5-ylmethyl) tetrahydrophthalate.

PRODUCTION EXAMPLE 11

A reactor equipped with a reflux condenser, stirrer, thermometer, decanter and nitrogen gas source was charged with 103 parts of diethylenetriamine and 300 parts of methylisobutylketone and heated at 140° C. for 4 hours. 36 parts of water were recovered leaving 367 parts of a 73% solution of corresponding ketimine in MIBK.

To the ketimine solution were added 980 parts of a bisphenol A epoxy resin (EPIKOTE 1004, Yuka Shell Epoxy K. K., epoxy equivalent 980) and.528 parts of MIBK, and the mixture allowed to react at 120° C. for 1 hour to give an amine-modified epoxy resin having a solid content of 67% and a primary amine equivalent of 61 meq./g. of solid.

PRODUCTION EXAMPLE 12

A reactor equipped with a reflux condenser, stirrer, thermometer, decanter, drip funnel and nitrogen gas source was charted with 40 parts of xylene and heated to 100° C. To the reactor was added a monomer mixture having the following composition over 3 hours.

| | |
|---|---|
| Glycidyl methacrylate | 30 parts |
| Styrene | 10 parts |
| Methyl methacrylate | 40 parts |
| n-Butyl acrylate | 20 parts |
| t-Butylperoxy 2-ethylhexanoate | 0.7 parts |

After the addition, the mixture was kept at the same temperature for 30 minutes. Then 16.6 parts of xylene were added dropwise over 1 hour, and the mixture allowed to react at 100° C. for additional 3 hours and then cooled.

To this were added 78 parts of the ketimine solution produced in Production Example 11 and allowed to react at 100° C. for 2 hours. The product was precipitated by the addition of methanol. An amine-modified acrylic resin having a number average molecular weight (GPC method) of 22,000 and a primary amine equivalent of 2.71 meq./g was obtained.

PRODUCTION EXAMPLE 13

A reactor equipped with a reflux condenser, stirrer and drip funnel was charged with 297 parts of diphenylmethane-4, 4'-diisocyanate. To this were added 196 parts of furfuryl alcohol dropwise while maintaining the inner temperature at 50°–70° C. Furfuryl alcohol-blocked diphenylmethane-4, 4'-diisocyanate having 60% solid content was obtained.

Examples 1–7 and Comparative Examples 1–2

Various varnish compositions were formulated using compounds or resins produced in Production Examples as shown in Table 1, and each applied on a tinplate, baked at 160° C. for 20 minutes and tested for film weight loss upon baking and gel fraction.

The results are also shown in Table 1.

TABLE 1

| | Example (parts by weight) | | | | | | | Comparative EX. (parts by weight) | |
|---|---|---|---|---|---|---|---|---|---|
| | 1 | 2 | 3 | 4 | 5 | 6 | 7 | 1 | 2 |
| Polyamine of Production EX. 11 | — | 93.1 | — | 93.1 | — | 93.1 | — | 93.1 | — |
| Polyamine of Production EX. 12 | — | — | — | — | — | — | 75.1 | — | — |
| JEFFAMINE T-403* | 16.0 | — | 16.0 | — | 16.0 | — | — | — | 16.0 |
| Oxazolidinone component of Production EX. 1 | 21.3 | — | — | — | — | — | — | — | — |
| Oxazolidinone component of Production EX. 2 | — | 25,3 | 25.3 | — | — | — | — | — | — |
| Oxazolidinone component of Production EX. 3 | — | — | — | 27.4 | 27.4 | — | — | — | — |
| Oxazolidinone component of Production EX. 4 | — | — | — | — | — | 20.0 | 25.0 | — | — |
| Blocked diisocyante of Production EX. 13 | — | — | — | — | — | — | — | 37.0 | 37.0 |
| Butycelloxolve | 37.3 | 44.4 | 28.7 | 58.5 | 43.4 | 55.0 | 55.0 | 39.3 | 23.6 |
| Dibutyltin oxide | 0.7 | 1.6 | 0.7 | 2.0 | 0.9 | 2.0 | 2.0 | 1.7 | 0.8 |
| Film thickness, micron | 20 | 20 | 20 | 20 | 20 | 20 | 20 | 20 | 20 |
| Film weight loss, %** | 3.6 | 2.5 | 3.8 | 2.8 | 4.2 | 3.0 | 2.3 | 9.8 | 18.5 |
| Gel fraction, %*** | 75 | 92 | 90 | 92 | 91 | 92 | 93 | 96 | 95 |

*Texaco Chemical, primary amine equivalent 6.16 meq./g.
**The film was weighed after drying at 105° C. for 3 hours (A), and re-weighed after baking at 160° C. for 20 minutes (B). The film weight loss was calculated by the following equation: Film weight loss = (A − B)/A × 100
***The film was weighed immediately after baking at 160° C. for 20 minutes (C), and re-weighed after soaking in refluxing methyl ethyl keton for 2 hours followed by drying at 105° C. for 30 minutes (D). The gel fraction was calculated by the following equation: Gel fraction = (C − D)/C × 100

It is apparent from Table 1 that the composition of this invention exhibits very low emission of emanating by-products compared with known compositions.

What is claimed is:

1. A thermosetting resinous composition comprising:
   (a) a compound having a plurality of terminal and/or pendant 2-oxo-1, 3-oxazolidin-5-yl groups, and
   (b) a compound having a plurality of primary and/or secondary amino groups.

2. The thermosetting resinous composition according to claim 1 containing said component (a) and said component (b) at a ratio from 1:5 to 5:1 in terms of equivalents of said 2-oxo-1, 3-oxazolidin-5-yl group and said amino group respectively.

3. The thermosetting resinous composition according to claim 1, wherein said component (a) has an average molecular weight from 200 to 100,000 and an oxazolidinone equivalent from 0.02 to 20 meq./g.

4. The thermosetting resinous composition according to claim 3, wherein said component (a) is a modified bisphenol A epoxy resin of the formula I:

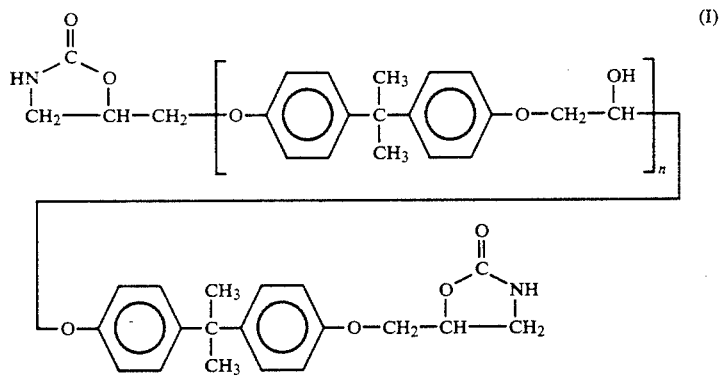

wherein n is 0, or an integer up to 10.

5. The thermosetting resinous composition according to claim 3, wherein said component (a) is a modified novolac epoxy resin of the formula II:

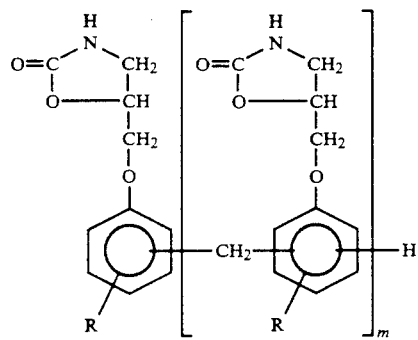

wherein R is a hydrogen atom or methyl, and m is an integer up to 10.

6. The thermosetting resinous composition according to claim 3, wherein said component (a) is an ester or ether of the formula III:

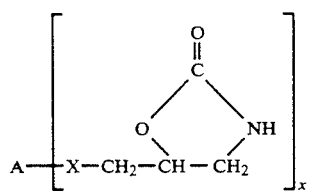

wherein A is the residue of a polycarboxylic acid with removal of the carboxylic function or the residue of an aliphatic polyol with removal of the hydroxyl function, X is an ester linkage when A is the polycarboxylic acid residue or an ether linkage when A is the polyol residue, and x is the valence of the residue A.

7. The thermosetting resinous composition according to claim 3, wherein said component (a) is an acrylic polymer having a plurality of oxazolidinone ring-containing pendant groups.

8. The thermosetting resinous composition according to claim 1, wherein said component (b) has an average molecular weight from 150 to 100,000 and an amine equivalent from 0.02 to 30 meq./g.

9. The thermosetting resinous composition according to claim 8, wherein said component (b) is a polyoxyalkylenepolyamine.

10. The thermosetting resinous composition according to claim 8, wherein said component (b) is an amine-modified bisphenol A epoxy resin produced by reacting the bisphenol A epoxy resin with a compound having both primary and secondary amine function of which primary amine function has been blocked by the reaction with a ketone to form a corresponding ketimine.

11. The thermosetting resinous composition according to claim 8, wherein said component (b) is an amine-modified acrylic polymer produced by reacting a homo- or copolymer of glycidyl acrylate or glycidyl methacrylate with a compound having both primary and secondary amine functions of which primary amine function has been blocked by the reaction with a ketone to form a corresponding ketimine.

12. The thermosetting resinous composition according to claim 1, wherein at least one of said component (a) and said component (b) is at least tri-functional.

* * * * *